United States Patent
Kalemkarian et al.

(10) Patent No.: US 10,061,676 B2
(45) Date of Patent: Aug. 28, 2018

(54) REMOTELY LOCATED TIMING METHOD AND DEVICE FOR A PROCESSING UNIT IN AN INFORMATION PROCESSING SYSTEM

(71) Applicant: BULL SAS, Les Clayes Sous Bois (FR)

(72) Inventors: Yann Kalemkarian, Grenoble (FR); Jean-Vincent Ficet, La Chapelle Blanche (FR); Philippe Couvee, Villard Bonnot (FR); Sébastien Dugue, Saint Theoffrye (FR)

(73) Assignee: BULL SAS, Les Clayes Sous Bois (FR)

( * ) Notice: Subject to any disclaimer, the term of this patent is extended or adjusted under 35 U.S.C. 154(b) by 321 days.

(21) Appl. No.: 14/024,569

(22) Filed: Sep. 11, 2013

(65) Prior Publication Data
US 2014/0082228 A1 Mar. 20, 2014

(30) Foreign Application Priority Data

Sep. 12, 2012 (FR) ...................... 12 58567

(51) Int. Cl.
*G06F 11/30* (2006.01)
*G06F 3/00* (2006.01)
(Continued)

(52) U.S. Cl.
CPC ........ *G06F 11/3048* (2013.01); *G06F 9/4825* (2013.01); *G06F 11/0724* (2013.01); *G06F 11/0757* (2013.01)

(58) Field of Classification Search
CPC ............... G06F 9/4825; G06F 11/0757; G06F 11/3048; G06F 11/0724
(Continued)

(56) References Cited

U.S. PATENT DOCUMENTS 6,179,489 B1 1/2001 So et al.
6,609,151 B1 * 8/2003 Khanna ................. G06F 9/4411
 709/208
(Continued)

OTHER PUBLICATIONS

Foong, Annie et al. An Architecture for Software-Based iSCSI on Multiprocessor Servers, Proceedings of the 19th IEEE International Parallel and Distributed Processing Symposium, 2005, pp. 1-7, IEEE.
(Continued)

*Primary Examiner* — Idriss N Alrobaye
*Assistant Examiner* — Brooke J Taylor
(74) *Attorney, Agent, or Firm* — Pillsbury Winthrop Shaw Pittman LLP (57) ABSTRACT

A system comprising a peripheral having a timing mechanism and a node, one of which comprises a real memory space and the other a corresponding virtual memory space, is disclosed. On receiving a timing command in the real memory space, comprising references to an event and time, an entry comprising data relative to the event and time references is created in a monitoring queue of the peripheral. A current point in time is then compared, in the peripheral, to a scheduled point in time linked to an item of data relative to a time reference stored in the monitoring queue. In response, if the current point in time is after the scheduled point in time, an item of data relative to a reference linked to the item of data relative to a time reference stored in the monitoring queue is stored in the real memory space.

12 Claims, 3 Drawing Sheets

(51) Int. Cl.
*G06F 11/07* (2006.01)
*G06F 9/48* (2006.01)
(58) Field of Classification Search
USPC .......................................................... 710/18
See application file for complete search history.

(56) References Cited

U.S. PATENT DOCUMENTS

| | | | |
|---|---|---|---|
| 6,876,952 B1* | 4/2005 | Kappler et al. ............... | 702/187 |
| 7,472,237 B1 | 12/2008 | Herbst et al. | |
| 2008/0072106 A1* | 3/2008 | Hamilton .............. | G06F 9/4825 |
| | | | 714/51 |
| 2008/0107104 A1* | 5/2008 | Olderdissen et al. ........ | 370/389 |
| 2010/0057660 A1* | 3/2010 | Kato .............................. | 706/47 |

OTHER PUBLICATIONS

Muir, Steve et al., AsyMOS—An Asymmetric Multiprocessor Operating System, Open Architectures and Network Programing, 1998, pp. 25-34, IEEE.

INPI, French Preliminary Search Report, Jun. 20, 2013, for French Patent Application No. 1258567.

* cited by examiner

REMOTELY LOCATED TIMING METHOD AND DEVICE FOR A PROCESSING UNIT IN AN INFORMATION PROCESSING SYSTEM

RELATED APPLICATION

This application claims benefit of priority to French Application No. 1258567, entitled "Procédé et dispositif de décompte du temps déporté pour unité de traitement dans un système de traitement de l'information", filed on Sep. 12, 2012. The disclosure of the above-described application is hereby expressly incorporated by reference in its entirety.

BACKGROUND

Field

The present application concerns the processing of instructions and data in information processing systems and more particularly a timing method and device located remotely, in particular in a peripheral, for a processing unit, in an information processing system, which is adapted, in particular, for a cluster node.

Description of the Related Art

High Performance Computing (HPC) is being developed for university research and industry alike, in particular in technical fields such as the motor car industry, aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), others to store data (storage nodes) and one or more others manage the cluster (administration nodes). Each node is for example a server implementing an operating system such as Linux (Linux is a trademark). The connection between the nodes is, for example, made using Ethernet communication links and interconnection networks (for example Infiniband) (Ethernet and Infiniband are trademarks).

Figure 1:
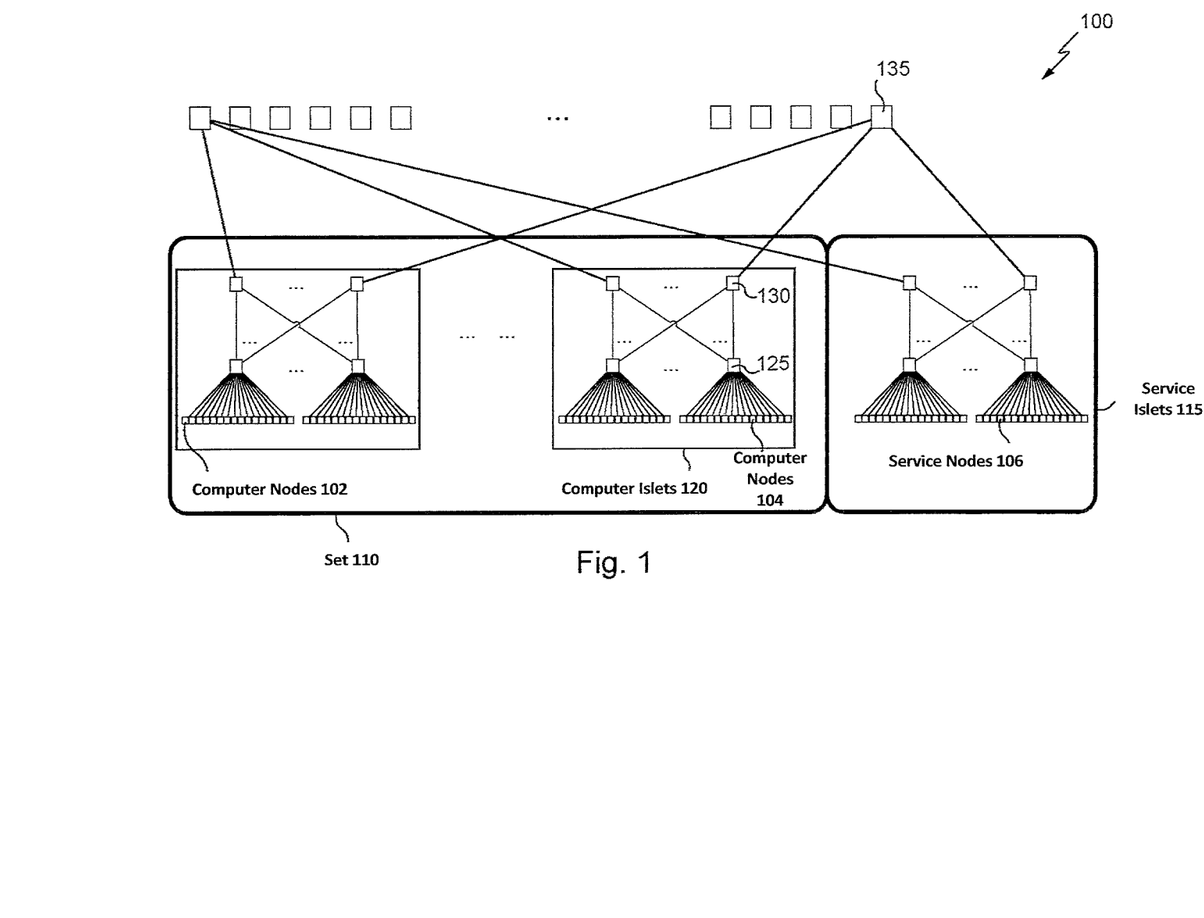
FIG. 1 illustrates an example of topology for a cluster.

FIG. 1 is a diagrammatic illustration of an example of a topology 100 for a cluster of fat-tree type. The latter comprises a set of nodes. The nodes belonging to the set 110 are compute nodes 102 and 104 whereas the nodes of the set 115 being called a service islet, are service nodes 106 (storage nodes and administration nodes). The compute nodes 104 may be grouped together in sub-sets 120 called compute islets.

The nodes are linked together by switches, for example hierarchically. In the example illustrated in FIG. 1, the nodes are connected to first level switches 125 which are themselves linked to second level switches 130 which in turn are linked to third level switches 135.

Figure 2:
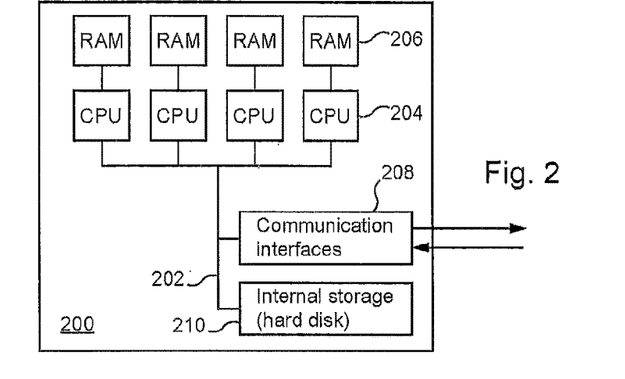
FIG. 2 illustrates an example of architecture for a node of a cluster.

As illustrated in FIG. 2, each node generally comprises one or more microprocessors, local memories and a communication interface. More specifically, the node 200 comprises a communication bus 202 to which there are connected:

Central Processing Units (CPUs) or microprocessors 204;
components of Random Access Memory (RAM) 206, comprising registers adapted to record variables and parameters created and modified during the execution of programs (as illustrated, each random access memory component may be associated with a microprocessor); and, communication interfaces 208 adapted to send and to receive data.

The node 200 furthermore possesses internal storage means 210, such as hard disks, able in particular to contain the executable code of programs.

The communication bus allows communication and interoperability between the different elements included in the node 200 or connected to it. The microprocessors 204 control and direct the execution of the instructions of portions of software code of the program or programs. On powering up, the program or programs which are stored in a non-volatile memory, for example a hard disk, are transferred into the random access memory 206.

As with HPC applications, the clusters used for implementing those applications are optimized. In particular, no function based on time, for example a sending function dependent on a maximum waiting time limit, called timeout, is generally provided. This is because these functions are typically based on timers or clocks, the use of which gives rise to excessively high performance penalties on account of the fact that they are generally managed by the operating system used which may therefore be called upon for each utilization. Furthermore, the resolution of these timers is often not sufficiently high for real applications.

To use a timer to implement alarms or enable the sending of time notifications to processes of an HPC application amounts to each process registering with the kernel of the operating system via a call system, known as syscall to be notified of the scheduled time. The notification is made by a signal sent from the kernel to the process or by an operation via a communication channel known as a pipe. However, such an embodiment is often too disadvantageous to be used in practice.

Despite these findings, functions based on time are useful for certain HPC applications, for example medical applications which must perform computations in a very constrained time or applications for weather forecasting, which may require to be dynamically re-parameterized. Such applications need to use timers efficiently to optimize the sequencing and progression of their codes.

There is thus a need to enable the execution of functions based on time, in particular timing functions, in architectures of cluster type.

SUMMARY

The invention thus relates to a timing method in a system comprising a peripheral and at least one node enabling the execution of an operating system and of at least one application process, one of said at least one node and said peripheral comprising a real memory space and the other of said at least one node and said peripheral comprising a virtual memory space corresponding at least partially to said real memory space, said peripheral providing a timing mechanism, the method comprising the following steps, on receiving a timing command in said real memory space, in a part corresponding to a part of said virtual memory space, said command comprising a reference to an event and a time reference, creating, in said peripheral, an entry in a monitoring queue, said entry comprising data relative to said event and time references;

comparing, in said peripheral, a current point in time and at least one scheduled point in time linked to an item of data relative to a time reference stored in said monitoring queue; and in response to said comparing, if said current point in time is after said at least one scheduled point in time, storing an item of data relative to a reference linked to said item of data relative to a time reference stored in said monitoring queue, in said real memory space, in a part corresponding to a part of said virtual memory space.

The method according to the invention thus makes it possible to provide functionalities based on the management of time without generating performance penalties linked to their utilization.

Advantageously, the method further comprises a step of estimating said the at least one scheduled point in time.

According to a particular embodiment, the method further comprises a step of selecting said monitoring queue from among a plurality of monitoring queues. The method according to the invention thus makes it possible to provide functionalities based on the management of time having sufficient resolution for real applications.

Still according to a particular embodiment, said selecting is at least partially based on a current point in time and a time reference.

Still according to a particular embodiment, said monitoring queue is ordered so as to facilitate management.

The present invention also relates to a computer program comprising instructions adapted for the implementation of each of the steps of the method described earlier when said program is executed on a computer.

The invention also relates to a timing device for a system comprising a peripheral and at least one node enabling the execution of an operating system and of at least one application process, one of said at least one node and said peripheral comprising a real memory space and the other of said at least one node and said peripheral comprising a virtual memory space corresponding at least partially to said real memory space, said device comprising a timing mechanism and the following means means for creating an entry in a monitoring queue on receiving a timing command in said real memory space, in a part corresponding to a part of said virtual memory space, said command comprising a reference to an event and a time reference, said entry comprising data relative to said event and time references;

means for comparing a current point in time and at least one scheduled point in time linked to an item of data relative to a time reference stored in said monitoring queue; and means for storing, in response to said comparing, if said current point in time is after said at least one scheduled point in time, an item of data relative to a reference linked to said item of data relative to a time reference stored in said monitoring queue, in said real memory space, in a part corresponding to a part of said virtual memory space.

The device according to the invention thus makes it possible to provide functionalities based on the management of time without generating performance penalties linked to their utilization.

According to a particular embodiment, the device further comprises a timer and a mechanism for selecting a monitoring queue from among a plurality of monitoring queues. The device according to the invention thus makes it possible to provide functionalities based on the management of time having sufficient resolution for real applications.

Still according to a particular embodiment, said selecting mechanism is at least partially based on a value of said timer.

The invention also relates to a peripheral comprising the device described above and said real memory space.

BRIEF DESCRIPTION OF THE DRAWINGS

Other advantages, objects and features of the present invention will emerge from the following detailed description, given by way of non-limiting example, relative to the accompanying drawings.

DETAILED DESCRIPTION

In general terms, the application advantageously combines a virtual address management mechanism for a user space associated with a kernel of an operating system implemented in the node of a cluster with a time management system which is located remotely, typically implemented in a peripheral, in order to provide, in particular, an alarm functionality in an application process of the node, without affecting the kernel.

The remotely located time management mechanism may be implemented, for example, in a network card.

Thus, in order to provide functions based on time to applications of HPC type executed in clusters, the application combines several parts, including:

programming functionalities implemented in middleware providing an API (standing for Application Programming Interface) for users, for example an API of MPI (standing for Message Passing Interface) or Portal type;

a system for time management comprising virtualization of the alarms and a timer management algorithm; and a system for notification of scheduled times able to be provided in accordance with a mechanism of userland type (that is to say a mechanism implemented in a user memory space and used by the operating system to interact with the kernel), independently of the kernel, making it possible to obtain real granularities for a bus transfer that is to say obtain a temporal resolution of the order of the duration of a transfer of an item of data via a data bus (typically 100 ns).

The time management system, comprising virtualization of the alarms and a timer management algorithm, is integrated here in hardware form, for example in the form of an electronic component implemented in a network card. This component then comprises a notification system using an item of temporal information (an alarm, a timeout, etc.) adapted to the needs of applications according to the degree of precision required in terms of latency or granularity.

According to a particular embodiment, the time management system uses a timer and an event monitoring queue manager, which is cyclical, making it possible to select an event monitoring queue, also known as an event queue, to process according to the value of the timer and the number of event monitoring queues managed.

The timer is a register which increments to count time like an integer according to impulses received, also known as timer ticks, typically at regular intervals. The required number of impulses received to increment the timer by one defines the granularity of the time management system. This granularity may, for example, vary from a few nanoseconds to a few microseconds according to the demand and the workload induced by the number of events in the system.

The cyclical event queue manager uses a time base which represents the number of event queues managed. Each event queue is used to store couples each formed from a scheduled time and a reference to a description of an event (or reference to an event). As described above, an event queue may be identified by the value of the timer and the number of queues managed, for example by using the modulo operator. In this case, the value of the timer modulo the number of queues managed gives an identifier of the event queue to process.

Each event queue is ordered here according to the scheduled times associated with the events. Thus, at a given point in time, all the events in the selected event queue, the references of which are associated with scheduled times earlier than a given point in time, typically the present point in time, are processed.

An event is directly accessible here by a user via an API. It generally comprises a scheduled time and a reference to a description of an event, typically a pointer to a table, a cache memory or a list of messages. A scheduled time associated with an event is typically a time calculated on the basis of a point in time for reception of a command relative to an event and a time limit such as a timeout.

According to a particular embodiment, the time management system comprises several functions or macros. An example of such functions include an initialization macro the object of which is to set up parameters of the time management system (in particular the time base and the granularity) and allocate event queues. The functions can further include a cleanup macro to "clean" events recorded in the time management system, on an individual, collective or full basis, that is to say to remove events for which the corresponding processes are apparently dead. The functions can further include an insertion macro enabling events to be inserted in ordered event queues. The functions can further include a macro to remove events from event queues, for example when those events have been processed. The functions can further include a storage macro to store the event queues.

It is to be noted that although, in the embodiment presented here, the events are managed in the form of an event queue, they may also be managed in other forms, for example in the form of trees making it possible to optimize the insertion of events according to the associated scheduled times according to the pairs of events and scheduled times stored previously.

As described above, the time management system may be implemented here as hardware in a remote system, for example in a system of network card type.

An example of a mechanism for managing queues of a time management system, in accordance with a particular embodiment, is illustrated with reference to FIG. 3.

Figure 3:
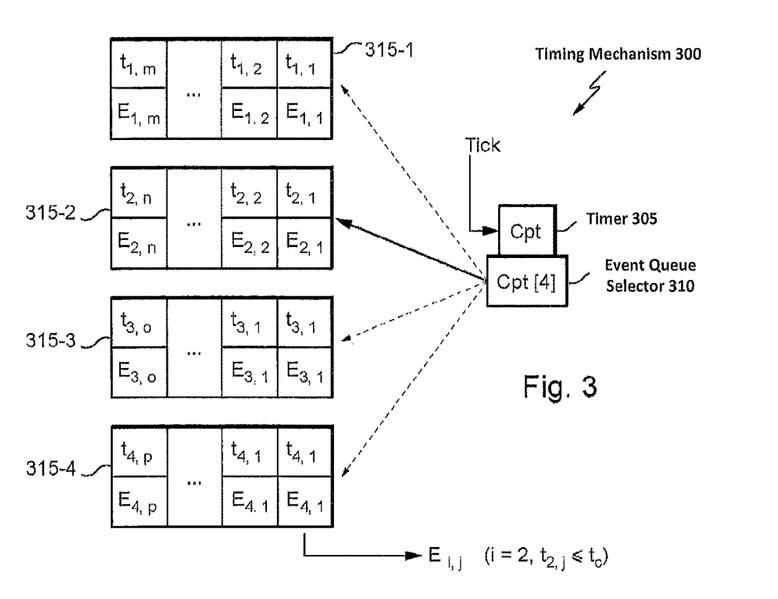
FIG. 3 represents an example of a mechanism for managing queues of a time management system, in accordance with a particular embodiment.

Such a mechanism, referenced 300 in FIG. 3, comprises a timer 305, the value of which is denoted Cpt, and which is incremented on the basis of received pulses. The timer 305 is linked to an event queue selector 310. The object of the latter is the selection of an event queue from among several, here from among four referenced 315-1 to 315-4. As illustrated, the selection of an event queue 315-$i$ is carried out here using the index i according to the value Cpt of the timer 305 modulo 4 representing the number of event queues or the time base (i=Cpt [4]).

According to the example represented, the value of the index i is equal to 2. This therefore means that the event queue 315-2 is selected, as illustrated by the arrow in solid line drawn between the event queue selector 310 and the event queue 315-2.

Each event queue, generally referenced 315, comprises a set of pairs constituted by a scheduled time denoted $t_{i,j}$ and by an event reference denoted $E_{i,j}$, i represents an event queue index whereas j represents an index of a pair in an event queue. As described above, the pairs are ordered here in increasing order according to the scheduled times ($t_{i,1} \le t_{i,2} \le \ldots \le t_{i,n}$). Thus, for example, the event queue 315-1 comprises a set of pairs among the pairs ($t_{1,1}$, $E_{1,1}$), ($t_{1,2}$, $E_{1,2}$) and ($t_{1,3}$, $E_{1,3}$).

When the queue (i) is selected, all the events ($E_{i,j}$) associated with that queue and with scheduled times ($t_{i,j}$) earlier than the current time ($t_c$) are selected. Thus, in the illustrated example, all the events ($E_{2,j}$) associated with the times ($t_{2,j}$) earlier than the current time are selected ($\forall j, t_{2,j} \le t_c$).

In the essential, the event queue management mechanism uses two functions, one function for adding a reference to an event and an associated scheduled time to an event queue and a function to remove a reference to an event and the associated scheduled time from an event queue.

By way of illustration, the function for adding an event to an event queue is, for example, the following function:

SET($t_0$,d,ref);

where $t_0$ is an initial time, d represents a duration and ref represents a reference of an event to notify when the current time ($t_c$) gets to a scheduled time defined as being the initial time $t_0$ at which is added the duration d ($t_c \ge t_0 + d$).

Still by way of illustration, and alternatively, the function for adding an event to an event queue may be the following:

SET(t,ref);

where t is a scheduled time and ref represents a reference for an event to notify when the current time gets to the scheduled time ($t_c \ge t$).

When such a function is called, an entry is created in an event queue of the queue management mechanism, that entry comprising the reference ref to the event as well as the scheduled time t, or data relative to that information. That entry is created such that the scheduled times for the events of the same event queue are ordered.

When the event queue management mechanism comprises several event queues, the event queue i in which is to be created the entry comprising the reference for the event and the scheduled time is determined here on the basis of the current time and the selected event queue at the current time. Thus, for example, if the event queue management mechanism comprises n event queues and the event queue selected at the present point in time is the event queue j, the event queue in which the entry is created is the event queue i with i=j+($t_0$+d−$t_c$)[n] or i=j+(t−$t_c$)[n].

Similarly, a function REM ($t_0$, d, ref) or REM (t, ref) may be used to delete an entry having the parameters ($t_0$, d, ref) or (t, ref) from an event queue of the event queue management mechanism.

Figure 4:
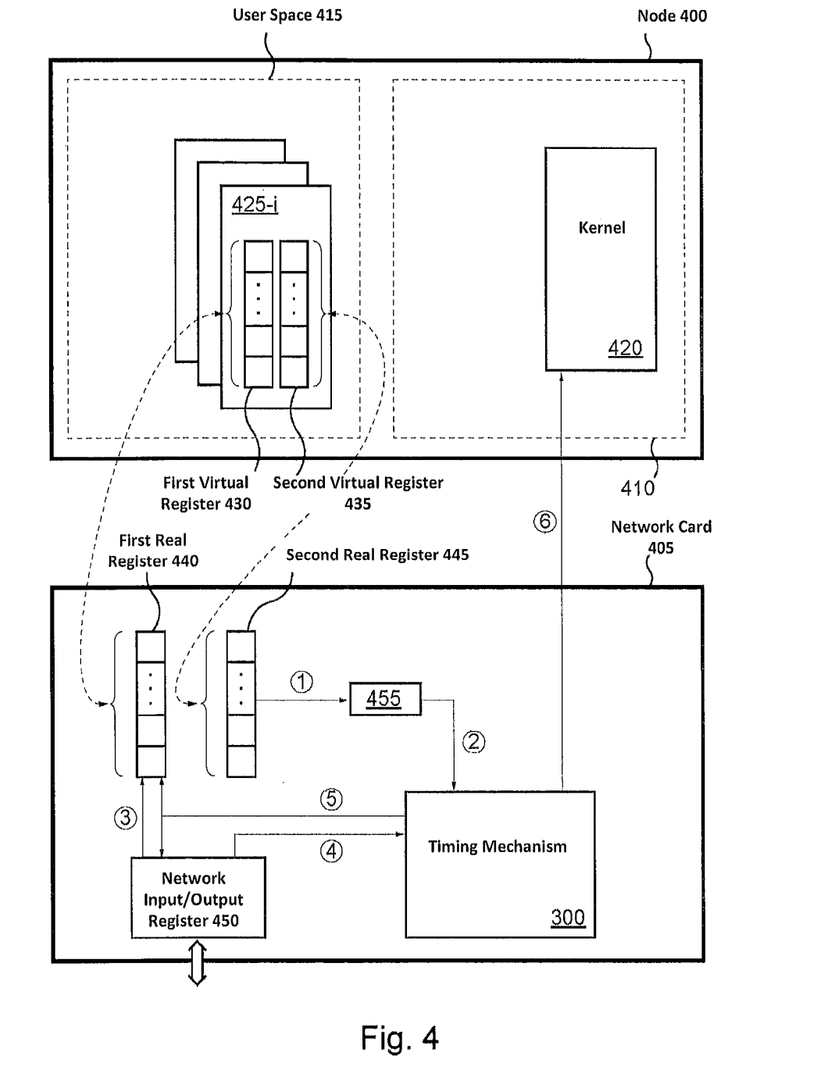
FIG. 4 illustrates an example of integration of an event queue management system, such that represented in FIG. 3, in a time management system implemented in a peripheral such as a network card linked to a node of a cluster.

FIG. 4 illustrates an example of integration of an event queue management system, such as that represented in FIG. 3, in a time management system implemented in a system located remotely such as a network card linked to a node of a cluster. One particular embodiment is implemented in a cluster comprising a node 400 and a network card 405. It provides functions linked to the management of time in the node 400.

The node 400 comprises in particular a space 410 linked to the operating system of the node 400 and a user space 415. The space 410 linked to the operating system comprises, in particular, the kernel 420 thereof. The user space 415 enables the execution of processes, in particular the process 425-$i$ to which is linked a virtual memory space here comprising a first virtual register 430 for events and a second virtual register 435 for commands.

The network card 405 here comprises the event queue management mechanism 300 described with reference to FIG. 3. It also comprises a real memory space here comprising a first real register 440 for events and a second real register 445 for commands, a network input/output register 450 as well as a command interpreter 455.

The command interpreter 455 is adapted to read commands in the first real register 440 for commands and to interpret those commands with regard to functions provided by the event queue management mechanism 300. The latter is capable of generating events which may be sent to the first real register 440 for events and to the network input/output register 450. Optionally, the event queue management mechanism 300 may also be adapted to send interrupts to the kernel 420 of the node 400.

The first virtual register 430 for events of the node 400 is linked to the first real register 440 for events of the network card 405 and the second virtual register 435 for commands of the node 400 is linked to the second real register 445 for commands of the network card 405.

Such links, based on the use of virtual addresses, enable reading from and writing to a remote device. Thus, in particular, when a command is written to an address of the first virtual register 435 for commands of the node 400, it is written to the corresponding address of the first real register 445 for commands of the network card 405. Similarly, when an event is read at an address of the second virtual register 430 for events of the node 400, it is read at the corresponding address of the second real register 440 for events of the network card 405.

Using these mechanisms for managing time and virtual addressing, it is possible to use functions based on time in the node 400 without those functions being implemented in the kernel of that node.

It is to be noted here that although the virtual registers are implemented here in the node 400 and the real registers in the network card 405, it is possible, alternatively, to implement the virtual registers in the network card 405 and the real registers in the node 400. It is also possible to implement some of the virtual registers and some of the real registers in the network card 405 and some of the virtual registers and some of the real registers in the node 400.

By way of illustration, it is considered here that an application implemented in the user space 415 of the node 400 wishes to receive a message from a remote process, that is to say executed in another node of the cluster, within a given time, without having to monitor the reception of such a message. Such a constraint may in particular be linked to problems known under the name of load-balancing.

For these purposes, the application generates a command which is written in the first virtual register 435 for commands of the node 400. On account of the mechanism for managing virtual memory between the registers 435 and 445, that command is written in the first real register 445 for commands of the network card 405. This command may, for example, have been initiated by the following function of the MPI library:

MPI_RECV(params,timeout,request);

comprising, in addition to the standard parameters (params and request) directing to defining the node for which the message is to be received as well as to identifying the latter, a parameter timeout directed to defining a period of time beyond which waiting for a message is interrupted.

After having written in the register 445, that command is read by the command interpreter 455 (step 1). On interpreting the command, the command interpreter 455 creates an event with which it associates a scheduled time (t) calculated as being the current time ($t_c$) to which is added the time limit timeout (t=$_c$+timeout). A reference to that event and the associated scheduled time are then inserted (step 2) into an event queue, preferably ordered, of the event queue management mechanism 300.

As described above, when the latter comprises several event queues, the event queue i in which is to be inserted the reference to the event and the associated scheduled time is determined on the basis of the current time and the value of the time limit timeout modulo the number n of event queues of the event queue management mechanism (i=($t_c$+timeout) [n]).

This command is typically followed by a command to wait for an event, for example the function of the library MPI:

MPI_WAIT(request);

Again, this command is obtained and interpreted by the command interpreter 455.

According to a particular embodiment, an entry is created in the input/output register 450 to specify certain of the parameters associated with the awaited message, that is to say to indicate a location for writing a particular message.

The application executed on the node 406 then executes in standard manner.

If the message awaited from the network is received, via the input/output register 450 (according to parameters stored beforehand by it), before the value of the current time ($t_c$) reaches that of the scheduled time (t) calculated previously ($t_c$<t), the message is processed in standard manner. It is sent to the node 400 via the registers 440 and 430 (step 3). Furthermore, the reference to the corresponding event and scheduled time which are stored in an event queue of the event queue management mechanism 300 are deleted (step 4).

If, on the contrary, the value of the current time ($t_c$) exceeds that of the scheduled time (t) calculated previously ($t_c$>t), for example when the process at the origin of the message is dead, a notification is created by the event queue management mechanism. Such a notification may in particular consist of adding a particular event to the register 440, and thus the register 430, to alert the application and, preferably, to delete the entry corresponding to the reception of that message from the input/output register 450 in order to avoid that message being processed if it is received later (step 5).

According to a particular embodiment, an interrupt may be generated and sent to the kernel of the operating system of the node 400 (step 6).

Numerous other functions may be carried out in similar manner.

Thus, still by way of illustration, the kernel of the operating system of the node of a cluster may send to an application process a command for counting down for a given time, that is to say, write such a command in a virtual register for commands of the process. On account of the virtual memory management mechanism, that command may be written in a register for commands of a remotely located system implementing an event queue management mechanism. An entry having as parameters an alarm reference and a scheduled time which is determined according to the value of the countdown and the time of creation of the entry may then be created in an event queue of that mechanism. Thus, when the current time gets to the scheduled time, an alarm is generated, that is to say that a reference to that event is written in the event register of the remotely located system and, consequently, in the event register of the application process considered.

Naturally, to satisfy specific needs, a person skilled in the art will be able to apply modifications in the preceding description.

The invention claimed is:

1. A timing method in a system comprising a peripheral and at least one node enabling the execution of an operating system and an application process, the peripheral comprising a real memory space and the at least one node comprising a virtual memory space corresponding at least partially to the real memory space, the peripheral providing a timing mechanism to the at least one node remotely, the method comprising:

generating, in the virtual memory space of the at least one node, a timing command comprising a reference to an event and an associated time reference;

writing the timing command in the real memory space of the peripheral;

creating, in the remote peripheral, an entry in a monitoring queue, the entry comprising first data relative to the event and the associated time reference, the monitoring queue including a plurality of entries, each entry comprising a time reference and an associated event reference;

comparing, in the remote peripheral, a current point in time with a scheduled point in time stored in the monitoring queue;

in response to the comparing, when the current point in time is after the scheduled point in time, storing second data relative to an event reference associated with the scheduled point in time in a part of the real memory space of the peripheral that corresponds to the virtual memory space;

if an awaited message is received from another node at the peripheral before the scheduled point in time, processing the message at the at least one node and deleting the entry comprising the scheduled point in time from the monitoring queue.

2. The method according to claim 1, further comprising estimating the scheduled point in time.

3. The method according to claim 1, further comprising cyclically selecting the monitoring queue from among a plurality of monitoring queues.

4. The method according to claim 3, wherein the selecting is at least partially based on a current point in time and a time reference.

5. The method according to claim 1, wherein the monitoring queue is ordered based on the time references.

6. A non-transitory computer readable medium encoded with computer-executable instructions that, when executed, cause a computer to perform a timing method in the computer comprising a peripheral and at least one node enabling the execution of an operating system and an application process, the peripheral comprising a real memory space and the at least one node comprising a virtual memory space corresponding at least partially to the real memory space, the peripheral providing a timing mechanism to the at least one node remotely, the method comprising:

generating, in the virtual memory space of the at least one node, a timing command comprising a reference to an event and an associated time reference;

writing the timing command in the real memory space of the peripheral;

creating, in the remote peripheral, an entry in a monitoring queue, the entry comprising first data relative to the event and the associated time reference, the monitoring queue including a plurality of entries, each entry comprising a time reference and an associated event reference;

comparing, in the remote peripheral, a current point in time with a scheduled point in time stored in the monitoring queue;

in response to the comparing, when the current point in time is after the scheduled point in time, storing second data relative to an event reference associated with the scheduled point in time in a part of the real memory space of the peripheral that corresponds to the virtual memory space;

if an awaited message is received from another node at the peripheral before the scheduled point in time, processing the message at the at least one node and deleting the entry comprising the scheduled point in time from the monitoring queue.

7. A timing device for a system comprising a peripheral and at least one node enabling the execution of an operating system and an application process, the peripheral comprising a real memory space and the at least one node comprising a virtual memory space corresponding at least partially to the real memory space, the device comprising a timing mechanism provided by the peripheral to the at least one node remotely, and the following means:

means for generating, in the virtual memory space of the at least one node, a timing command comprising a reference to an event and an associated time reference;

means for writing the timing command in the real memory space of the peripheral;

means for creating by one or more processors, an entry in a monitoring queue on receiving a timing command in the real memory space, in a part corresponding to a part of the virtual memory space, the entry comprising first data relative to the event and the associated time reference, the monitoring queue including a plurality of entries, each entry comprising a time reference and an associated event reference;

means for comparing by the one or more processors, a current point in time with a scheduled point in time stored in the monitoring queue;

means for storing by the one or more processors, in response to the comparing, when the current point in time is after the scheduled point in time, second data relative to an event reference associated with the scheduled point in time in a part of the real memory space of the peripheral that corresponds to the virtual memory space;

means for processing an awaited message at the at least one node and for deleting the entry comprising the scheduled point in time from the monitoring queue if the message is received from another node at the peripheral before the scheduled point in time.

8. The device according to claim 7, further comprising a timer and a mechanism for selecting a monitoring queue from among a plurality of monitoring queues.

9. The device according to claim 8, wherein the selecting mechanism is at least partially based on a value of the timer.

10. A timing device for a system comprising a peripheral and at least one node enabling the execution of an operating system and an application process, the peripheral comprising a real memory space and the at least one node comprising a virtual memory space corresponding at least partially to the real memory space, the device comprising a timing mechanism provided by the peripheral to the at least one node remotely, and further comprising:

a software module configured to generate, in the virtual memory space of the at least one node, a timing command comprising a reference to an event and an associated time reference;

a software module configured to write the timing command in the real memory space of the remote peripheral;

a software module configured to create an entry in a monitoring queue on receiving a timing command in the real memory space, in a part corresponding to a part of the virtual memory space, the entry comprising first data relative to the event and the associated time reference, the monitoring queue including a plurality of entries, each entry comprising a time reference and an associated event reference;

a software module configured to compare a current point in time with a scheduled point in time stored in the monitoring queue;

a software module configured to store, in response to the comparing, when the current point in time is after the scheduled point in time, second data relative to an event reference associated with the scheduled point in time in a part of the real memory space of the peripheral that corresponds to the virtual memory space; and a software module configured to process an awaited message at the at least one node and delete the entry comprising the scheduled point in time from the monitoring queue if the message is received from another node at the peripheral before the scheduled point in time.

11. The method according to claim 1, wherein the timing mechanism is not implemented in a kernel of the operating system.

12. The method according to claim 1, wherein the second data relative to the event reference associated with the scheduled point in time is stored in the part of the real memory space of the peripheral such that the virtual memory space or a virtual register associated with the application process is written with the second data relative to the event.

* * * * *